ON-TIME SILICON CONTROLLED RECTIFIER CIRCUIT

Filed Oct. 27, 1960

INVENTOR.
Raymond E. Morgan
BY Charles W. Helzer
His Attorney

United States Patent Office 3,138,722
Patented June 23, 1964

3,138,722
ON-TIME SILICON CONTROLLED RECTIFIER CIRCUIT

Raymond E. Morgan, Schenectady, N.Y., assignor to General Electric Company, a corporation of New York
Filed Oct. 27, 1960, Ser. No. 65,531
6 Claims. (Cl. 307—88.5)

This invention relates to a new and improved power amplifier circuit of the proportional control type.

More particularly, the invention relates to a new and improved proportional control power amplifier of the type described in copending United States Patent No. 3,019,-355, issued January 30, 1962, R. E. Morgan, Inventor, entitled "Magnetic Silicon Control Rectifier Power Amplifier," and to an improvement in the manner of controlling the on-time of such amplifiers.

The proportional control power amplifier circuits described in the above copending United States patent application employ a circuit combination comprising a gate controlled unidirectional conducting device of the type wherein the gate loses control over conduction through the device after it has turned it on, and a saturable reactor and charging capacitor connected to accomplish the task of turning off the gate controlled unidirectional conduction device after it has been rendered conductive. One problem associated with circuits of the above type is to control the length of time that the unidirectional conducting device is turned on, and hence the amount of power delivered to a load through the device. In order to correct this condition the present invention was devised.

It is therefore a primary object of the present invention to provide a new and improved proportional control power amplifier wherein control can be exercised over the period of time the amplifier conducts load current through a load.

In practicing the invention a gate, controlled unidirectional conducting device is provided which is of the type having a cathode-anode and gating electrode wherein conduction through the device is initiated by the gating electrode, and thereafter the gating electrode loses control over conduction through the device. A gating signal source is provided for applying a gating on signal to the gating electrode of the unidirectional conducting device to render it conducting. In order to turn the unidirectional conducting device off a first saturable reactor is connected to the unidirectional device, and a charging capacitor is connected in circuit relationship with the saturable reactor and with the unidirectional conducting device. This circuit arrangement then operates to develop a quenching potential that is applied to the unidirectional conducting device upon the saturable reactor reaching a saturated condition to thereby terminate conduction through the unidirectional conducting device. In order to control the on-time period of the unidirectional conducting device a second control saturable reactor is coupled to the first saturable reactor for controlling the operation of the first saturable reactor.

Other objects, features many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
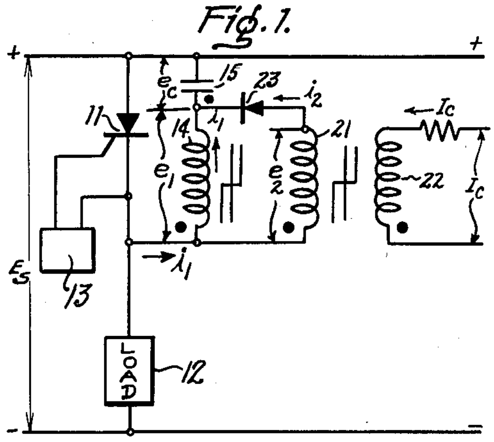
FIGURE 1 is a schematic circuit diagram of a new and improved proportional control power amplifier constructed in accordance with the invention.

The proportional control power amplifier shown in FIGURE 1 includes a unidirectional conducting device that comprises a silicon control rectifier 11 having a gate electrode, a collector electrode and an emitter electrode. The silicon control rectifier 11 is a PNPN semiconductor device manufactured and sold by the General Electric Company, and described in detail in a publication entitled "The Control Rectifier Manual," copies of which may be obtained from the Semiconductor Products Department of the General Electric Company, Syracuse, New York. Silicon control rectifier 11 is a solid state semiconductor version of the gaseous thyratron or ignitron wherein once the device has been turned on by application of a small gating signal to the gating electrode and conduction takes place through the device, the gating electrode thereafter loses control of conduction through the device. Rectifier 11 is connected in series circuit relationship with a suitable load device 12 across a source of operating potential $E_s$ which in the present example may comprise a 250 volt direct current power supply. Although it is to be understood that the new and improved power amplifier circuit is not restricted to use with a direct current power supply but may also be used with an alternating current supply to achieve commutation during alternate half cycles of the alternating current potential.

Conduction through the silicon control rectifier 11 is initiated by a gating signal source 13 for supplying gating signal pulses having a fixed repetition rate to the gating electrode. The gating circuit 13 may comprise any conventional square wave or pulsed signal source such as the gating signal circuits described in chapter 4 of the above identified control rectifier manual published by the General Electric Company. Gating circuit 13 preferably comprises a constant frequency supply source capable of supplying gating pulses at about 3 kilocycles per second rate, and having a pulse duration that is sufficient to turn on the silicon control rectifier 11, but which is less than the time on period of the silicon control rectifier. A preferred form of gating supply circuit is the unijunction transistor oscillator gating circuit described on pages 50 to 54 of the above identified control rectifier manual. This circuit is capable of supplying 5 microsecond gating pulses of approximately 3 volts and 80 milliamperes at a 3 kilocycle rate.

In order to turn off silicon control rectifier 11 after it has been rendered conductive by the gating signal source 13, a commutating circuit is provided which includes a first saturable reactor 14. Saturable reactor 14 comprises a single winding on a single saturable core fabricated in the manner of a conventional half-wave self saturating magnetic amplifier of the type described in the textbooks "Magnetic-Amplifier Circuits," first edition 1954, published by McGraw-Hill Company, Inc., New York—W. A. Geyger, author, and "Magnetic Amplifiers," first edition, 1955, published by John Wiley and Sons, Inc., New York by Dr. H. F. Storm. Saturable reactor 14 is connected in series circuit relationship with a charging device comprised by a commutating capacitor 15, and the series circuit thus formed is connected between the load 12 and the positive terminal of the source of operating potential $E_s$ in parallel with the silicon control rectifier 11. The commutating circuit thus comprised will operate to periodically apply a reverse potential from capacitor 15 across the silicon control rectifier 11 to cause a reverse current to flow and thereby cut off conduction through the rectifier.

In order to control the time-on period that the silicon control rectifier 11 is supplying load current through a load device, a second saturable core transformer 21, 22 is provided with one terminal of the secondary winding 21 of the transformer being connected through a blocking diode 23 to the junction of the first saturable reactor 14 and charging capacitor 15, and the remaining terminal of the secondary winding being connected to the first saturable reactor 14 and the load 12. The primary winding 22 of the saturable core transformer 21, 22 is connected to a source of control signals $I_c$ which preferably has current ranging in value from 0 to approximately 60 milliamperes.

The circuit comprised in the above described manner will operate to supply an interrupted or pulsed wave form load current through the load device 12. For convenience in explaining the operation of the circuit, the effect of the second saturable core transformer 21, 22 will be ignored initially. Upon placing the circuit in operation the gating supply source 13 turns on the silicon control rectifier 11 periodically at about a 3 kilocycle rate. At the instant of being turned on the silicon control rectifier 11 will draw load current through the load 12. Concurrently, the saturable reactor 14 which by reason of its previous cycle of operation will start from its residual condition of negative saturation with potential $e_1$ negative at the dot (.) end, and will draw a small charging current $i_1$ which will drive the saturable reactor 14 towards positive saturation where $e_1$ is positive at the dot end. During this portion of the operation the potential $e_c$ of the charging capacitor 15 will be negative at its dot end. The circuit without the second saturable reactor 21, 22 and its associated blocking diode 23 will then function exactly as the proportional control power amplifier described in the above identified copending Patent No. 3,019,355 of Ray E. Morgan, entitled "Magnetic Silicon Control Rectifier Power Amplifier." Hence, upon the charging current $i_1$ driving the saturable core reactor 14 into positive saturation with the potential $e_1$ positive at the dot end, the polarity of potential $e_c$ of charging capacitor 15 will be immediately reversed by oscillation of the charge on the commutating capacitor 15 through the closed circuit loop including SCR 11 and the saturated inductance of the saturable reactor 14 so that it becomes positive at the dot end of the capacitor with respect to the positive terminal (+). Thereafter, potential $e_c$ of the charging capacitor 15 will cause the saturable reactor 14 to be charged towards negative saturation, and upon reaching negative saturation so that the potential $e_1$ across the saturable reactor 14 is again negative at the dot end of the reactor, the positive potential $e_c$ across capacitor 15 which is positive at the dot end of capacitor 15 with respect to the positive terminal (+) will be applied almost directly to the emitter electrode of the silicon control rectifier 11 due to the fact that the impedance of the saturated reactor 14 is practically negligible. This will cause a reverse current flow through the rectifier which will extinguish conduction through the rectifier. If the effect of the second saturable transformer 21, 22 is ignored, then the period of time that the control rectifier 11 is maintained conducting, and hence turned on, is determined by the period of time required for the saturable reactor 14 to be charged to positive saturation, and then back to negative saturation. This period of time is of course fixed and dependent upon the parameters of the saturable reactor 14. In order to control this period of time, the second saturable core transformer 21, 22 together with its associated blocking diode 23 is provided.

Figure 4:
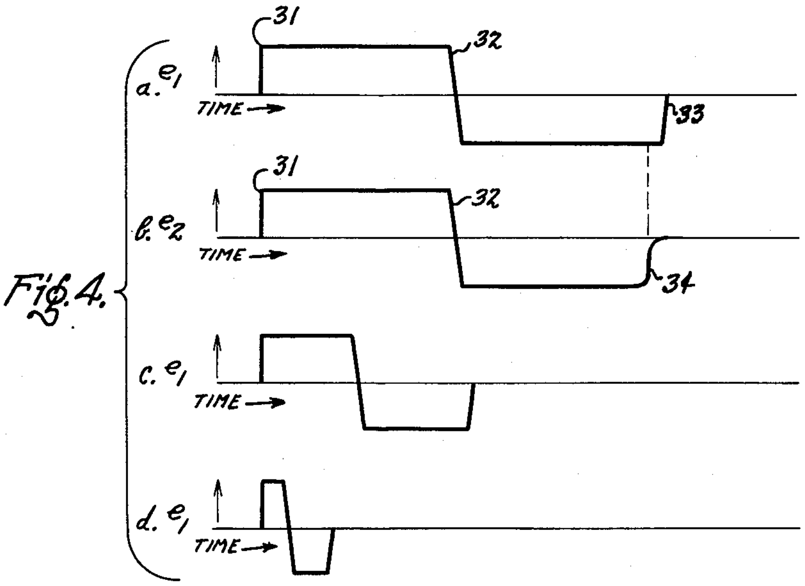
FIGURE 4 shows a series of voltage versus time characteristic curves of the potentials appearing across the control saturable reactors comprising a part of the proportional control power amplifiers shown in FIGURES 1 and 3.

At the beginning of a cycle of operation, both the first saturable core reactor 14 and the secondary winding 21 of the second saturable core transformer 21, 22 start from their negative saturation condition with the potentials $e_1$ and $e_2$ negative at the dot end. Upon a gating pulse being applied from gating signal source 13 to the silicon control rectifier 11 to turn it on, charging current $i_1$ will be supplied to the saturable winding 14 and charging current $i_2$ will be supplied to the saturable secondary winding 21 to cause these two windings to be driven towards their positive saturation condition where $e_1$ and $e_2$ will become positive at the dot ends. Assuming that the maximum control current of about 60 milliamperes is supplied to the primary winding 22 from the control current source $I_c$, then while the first saturable reactor winding 14 is traversing from negative to positive saturation, the second saturable winding 21 will traverse from a point of negative saturation to just below positive saturation. Upon the first saturable reactor winding 14 reaching positive saturation the polarity of potential $e_c$ of capacitor 15 is reversed which instantaneously starts driving the first saturable reactor winding 14 back towards negative saturation. This cannot occur with respect to the second saturable reactor 21 however, due to the blocking diode 23 which prevents a current reversal, and the second saturable reactor 21 will have to be reset to its negative satuation condition by the control current $I_c$ supplied to the control winding 22. Thereafter, the first saturable reactor winding 14 is driven into a negative saturation which will result in applying the positive polarity potential $e_c$ of the charging capacitor 15 across the silicon control rectifier 11 to cause a reverse current flow through the control rectifier and thereby turn it off in the previously described manner. The wave form of the voltages appearing across the two saturable reactor windings 14 and 21 are depicted in FIGURES 4*a* and 4*b*, respectively. In FIGURE 4*a* the point at which the gating signal source supply 13 turns on the control rectifier 11 and reactor 14 is at residual negative saturation, is shown at 31, the point at which the saturable reactor winding 14 reaches positive saturation and reverses the polarity of the potential $e_1$ appearing across the winding is shown at point 32, and the point at which the saturable reactor winding 14 reaches negative saturation is illustrated at 33. The potential $e_2$ appearing across the second saturable reactor winding 21, is shown in FIGURE 4*b* for the condition of $i_c$ being 60 milliamperes wherein at point 31 winding 21 is at negative saturation, at point 32 winding 21 reaches positive saturation, and at point 34 winding 21 is returned to negative saturation. From an examination of curves 4*a* and 4*b* it can be appreciated that the potentials $e_1$ and $e_2$ will be square waves as a consequence of the above cycle of operations. From a comparison of curve 4*b* to curve 4*a* it can be seen that the secondary winding 21 of the saturable core transformer does not reach positive saturation prior to the first saturable reactor winding 14 being driven into positive saturation.

Figure 2:
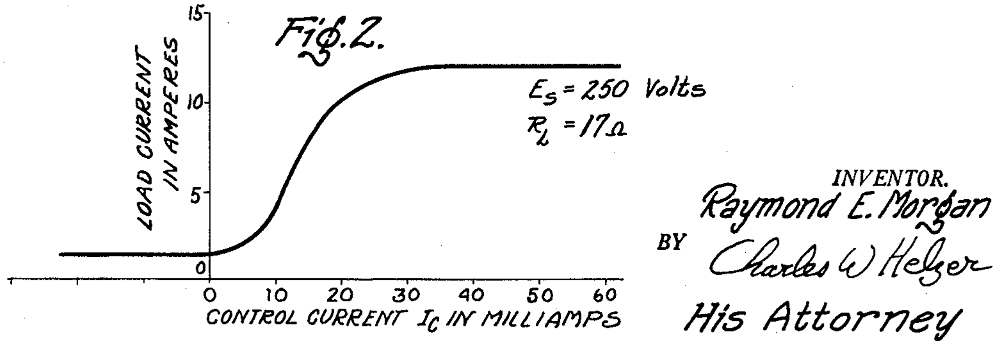
FIGURE 2 is a plot of of the characteristic curve obtained with the circuit of FIGURE 1 showing the load current obtained in response to a control signal applied to the input of the power amplifier circuit.

The control current versus load current characteristic curve for the proportional control power amplifier of FIGURE 1 is shown in FIGURE 2. From an examination of this curve it can be appreciated that if the control current $I_c$ is reduced to some intermediate value, for example, 15 milliamperes, it will cause the circuit to operate on the slope of its characteristic curve and the load current supplied to the load device 12 will be proportionally reduced. The reason for the reduction in load current is that the lower value control current $I_c$ supplied to the proportionate control amplifier fails to reset the second saturable core transformer winding 21 back into negative saturation prior to initiation of the next cycle of operation by the gating signal source 13. As a consequence, upon the gating supply source 13 turning on the control rectifier 11, first saturable core winding 14 will be at its residual negative saturation condition; however, the second saturable core transformer winding 21 will be at some intermediate point on its hysteresis loop so that the charging current $i_2$ will more quickly drive the second saturable core transformer winding 21 into positive saturation. This will occur while the first saturable core winding 14 is still being driven towards positive saturation; however, as a consequence of the second saturable core transformer winding 21 reaching its positive saturation condition, the polarity of the potential across the charging capacitor 15 will be reversed. Reversal of the polarity of the potential of capacitor 15 will of course immediately reverse the charging current $i_1$ so as to start charging the first saturable core reactor winding 14 back towards negative saturation thereby causing it to trace out only a minor hysteresis loop. Of course, upon the first saturable core winding 14 reaching negative saturation, the full charge on the capacitor 15 will be applied across the silicon control rectifier 11 causing a reverse current flow and thereby turn off the rectifier in the previously described manner. The turn off will occur in a much shorter time period however, due to the saturable reactor winding 14 having traced out only a minor hysteresis loop.

The wave form of the potential $e_1$ appearing across the first saturable core winding 14 is shown in FIGURES 4*c* and 4*d* for two intermediate values of control $I_c$. From a comparison of FIGURES 4*c* and 4*d* to FIGURES 4*a* and 4*b*, it can be appreciated that the periods of time required to drive the saturable reactor winding 14 through a minor hysteresis loop from negative saturation up to some intermediate point on the hysteresis curve and then back down into negative saturation, is cut down drastically. This results in reducing the on-time of the silicon control rectifier 11, and the load current supplied through the load device 12 is reduced proportionately.

Figure 3:
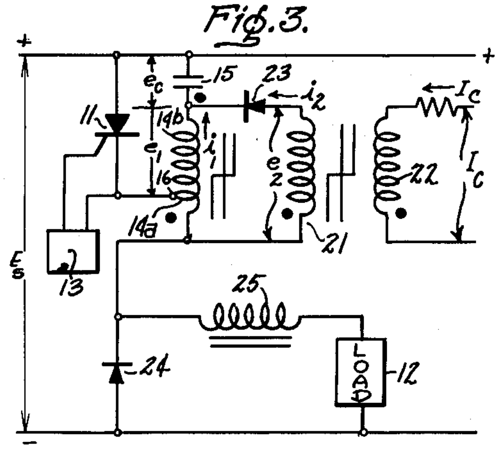
FIGURE 3 is a second form of proportional control power amplifier constructed in accordance with the invention.

The embodiment of the invention shown in FIGURE 3 of the drawings is identical in construction and operation to the FIGURE 1 form of the invention with the exception that the first saturable reactor 14 is connected as an autotransformer. As a result the reactor winding 14 is divided into a primary winding **14*a* and a secondary winding 14*b* and the load current supplied to load 12 is supplied through only the primary winding half 14*a*. Additionally, a filter circuit comprising a diode rectifier 24 and linear inductor 25 are connected across the load device 12** for the purpose of smoothing out the square wave form signal supplied to the load by the proportional control power amplifier circuit.

In operation, the load current supplied through the autotransformer winding half **14*a* of the first saturable core reactor 14 is transformed into the secondary winding 14*b* to cause the winding half 14*b* to be charged towards positive saturation in the previously described manner. In all other respects the operation of the circuits is identical to that described with relation to FIGURE 1. The advantages obtained with the circuit arrangement of FIGURE 3 are that the charge placed on the charging capacitor 15 is determined by the load current being supplied to load device 12, and hence assures that adequate charge will be built up on the capacitor 15 to insure quenching of conduction through the silicon control rectifier 11**, during its commutating period.

The following table of values for the circuits of FIGURE 1 and FIGURE 3 is listed as exemplary of two specific forms of the invention. It is to be understood that the invention is in no way restricted to construction with the values cited but may be fabricated in many different forms—

*Figure 1*

SR-14—Deltamax having ¼" x ¼" cross section and 200 turns.
SCR-11—C35C-General Electric
C-15—1 microfarad
D-23—1N1118-General Elec.
SR-21—
Core:
High Mu 80-79% Ni, 4% Mo, 17% Fe, ½" x ½" cross sect.

Secondary—400 turns
Primary—1000 turns
$E_s$—250 v. D.C.

*Figure 2*

SR-14—Deltamax core having ¼" x ¼" cross section.
Secondary—200 turns
Primary—30 turns
SCR-11—C35C-General Electric
C-15—1 microfarad
D-23—1N1118-General Electric
R-21—
Core:
High Mu 80-79% Ni, 4% Mo, 17% Fe,
Secondary—400 turns
Primary—1000 turns
L-25—20 millihenrys
G-24—IN2157-General Electric
$E_s$—250 v. D.C.

From the foregoing description it can be appreciated that the invention makes available a new and improved proportional control power amplifier wherein control can be exercised over the period of time that the amplifier conducts load current through a load.

Having described two embodiments of a new improved proportional control power amplifier constructed in accordance with the invention, it is believed obvious that other modifications and variations of the present invention are possible in light of the above teachings. It is therefore to be understood that changes may be made in the particular embodiment of the invention described which are within the full intended scope of the invention as defined by the appended claims.

What I claim as new and desire to secure by Letters Patent of the United States is:

1. A gate controlled conducting device of the type having at least a cathode, anode, and gating electrode wherein conduction through the device is initiated by the gating electrode but thereafter the gating electrode loses control over conduction through the device, means for applying a gating control signal to the gating electrode of said gate controlled conducting device to render it conductive, a first saturable reactor operatively coupled in the anode-cathode circuit of said gate controlled conducting device, a commutating capacitor connected in circuit relationship with said first saturable reactor and said gate controlled conducting device for commutating off said gate controlled conducting device upon said saturable reactor reaching a saturated condition to thereby terminate conduction through said gate controlled conducting device, and a second control saturable reactor connected in parallel with said first saturable reactor for controlling the operation of said first saturable reactor.

2. The combination set forth in claim 1 wherein the gate controlled conducting device is a silicon controlled rectifier.

3. A control amplifier including in combination a gate controlled unidirectional conducting device having a cathode, anode, and gating electrodes wherein conduction through the device is initiated by the gating electrode which thereafter loses control over conduction through the device and the relative anode-cathode potential of the device must be reversed to cut off conduction through the device, a first saturable core transformer having a primary winding connected in the anode-cathode circuit of said unidirectional conducting device and having a secondary winding inductively coupled to said primary winding, a commutating capacitor connected in series circuit relationship with said secondary winding of said first transformer across said unidirectional conducting device for applying a quenching potential which varies in magnitude with the magnitude of the load current to said unidirectional conducting device upon said secondary winding of said saturable transformer reaching a saturated condition, means for applying a gating control signal to the gate electrode of said unidirectional conducting device and a second saturable transformer having its secondary winding connected in parallel with at least the secondary winding of said first saturable transformer and having the primary winding coupled to a source of control signals.

4. A control amplifier including in combination a silicon controlled rectifier having an anode, a cathode, and gating electrode, a load circuit operatively coupled in the anode-cathode circuit of said silicon controlled rectifier, a first saturable core reactor operatively coupled in the anode-cathode circuit of said silicon controlled rectifier, a commutating capacitor connected in series circuit relationship with said first saturable reactor for applying a quenching potential which varies in magnitude with the magnitude of the load current to said silicon controlled rectifier upon said first saturable core reactor reaching a saturated condition, means for applying a gating control signal to the control electrode of said silicon controlled rectifier, and a second saturable reactor connected through a blocking diode to said first saturable reactor for controlling the operation of said first saturable reactor, said second saturable reactor being coupled to a source of control signals.

5. A control amplifier including in combination a silicon controlled rectifier having an anode, a cathode, and gating electrode, a load circuit operatively coupled in the anode-cathode circuit of said silicon controlled rectifier, a first saturable core transformer having its primary winding operatively coupled in the anode-cathode circuit of said silicon controlled rectifier and having a secondary winding inductively coupled to said primary winding, a commutating capacitor connected in series circuit relationship with the secondary winding of said first saturable transformer for commutating off said silicon controlled rectifier upon said first saturable transformer reaching a saturated condition, a second saturable transformer having its secondary winding connected through a blocking diode to at least the secondary winding of said first saturable transformer and having its primary winding coupled to a source of on-time control signals, and means for applying a gating control signal to the control electrode of said silicon controlled rectifier.

6. A grid controlled unidirectional conducting device of the type having a cathode, anode, and gating electrodes wherein conduction through the device is initiated by the gating electrode which thereafter loses control over conduction through the device and the relative anode-cathode potential of the device must be reversed to cut off conduction through the device, a load device connected in series circuit relationship with said unidirectional conducting device across a source of direct current operating potential, means for applying a gating control signal to the gating electrode of said unidirectional conducting device, a first saturable core reactor connected in parallel circuit relationship with said unidirectional conducting device between said load device and a first terminal said source of operating potential, a commutating capacitor connected in series circuit relationship with said first saturable reactor between said first saturable reactor and said first terminal of said source of direct current operating potential for applying a quenching current which varies in magnitude with the magnitude of the load current to said undirectional conducting device upon said first saturable core reactor reaching a saturated condition, a second saturable core reactor and a blocking diode, said second saturable core reactor being connected across said first saturable reactor through said blocking diode, and means for coupling a source of on-time control signals to said second saturable reactor.

References Cited in the file of this patent

UNITED STATES PATENTS

| | | |
|---|---|---|
| 2,561,734 | Germeshausen | July 24, 1951 |
| 2,578,043 | Christy | Dec. 11, 1951 |
| 2,773,184 | Rolf | Dec. 4, 1956 |
| 2,909,705 | Hussen | Oct. 20, 1959 |

OTHER REFERENCES

Mali: Magnetic Amplifiers, John F. Rider, Publishing Inc., August 1960, (p. 27 relied on).

Gutzwiller: "Phase Controlling Kilowatts with Silicon Semi-Conductors," (Reprint from May 1959, Control Engineering) (first page relied on).

Frenzel & Gutzwiller: "Solid-State Thyratron . . .," Electronics (reprint), March 28, 1958, (4 pp.) (first page relied on).

Reference Data for Radio Engineers, I.T. & T., N.Y., 4th ed. 1956 (p. 323 relied on).